United States Patent [19]

Striedacher et al.

[11] Patent Number: 5,683,184
[45] Date of Patent: Nov. 4, 1997

[54] THRUST AND COVER WASHER, MOUNTED ON A ROTOR SHAFT, FOR A BEARING OF THE ROTOR SHAFT

[75] Inventors: Manfred Striedacher, Kitzingen; Michael Rueb, Wuerzburg, both of Germany

[73] Assignee: Siemens Aktiengesellschaft, München, Germany

[21] Appl. No.: 504,814

[22] Filed: Jul. 20, 1995

[30] Foreign Application Priority Data

Aug. 24, 1994 [EP] European Pat. Off. .............. 94113214

[51] Int. Cl.$^6$ .................................................. F16C 33/74
[52] U.S. Cl. .......................... 384/138; 384/139; 384/223
[58] Field of Search ................................ 384/138, 139, 384/223, 220, 208, 203, 204

[56] References Cited

U.S. PATENT DOCUMENTS

| | | | |
|---|---|---|---|
| 4,270,759 | 6/1981 | Denton et al. | 84/138 |
| 4,574,212 | 3/1986 | Haijkens | 384/138 |

*Primary Examiner*—Lenard A. Footland
*Attorney, Agent, or Firm*—Kenyon & Kenyon

[57] ABSTRACT

In order to ensure full-surface thrust contact and coverage despite a low production and assembly outlay, even if the bearing is mounted slightly askew, a thrust and cover washer may be used which includes an inelastic first annular washer part axially thrusting and not contacting the rotor shaft, and an elastic second annular washer part positively joined thereto and resting sealingly on the rotor shaft. The first annular washer part may advantageously be made of plastic and the second annular washer part may advantageously be made of an elastomer.

34 Claims, 2 Drawing Sheets

5,683,184

THRUST AND COVER WASHER, MOUNTED ON A ROTOR SHAFT, FOR A BEARING OF THE ROTOR SHAFT

BACKGROUND OF THE INVENTION

The present invention relates to a thrust and cover washer, mounted on a rotor shaft, for a bearing of the rotor shaft. An axially thrusting inelastic first annular washer part is included which is not in contact with the rotor shaft. An elastic second annular washer part is positively joined to the rotor shaft and rests sealingly on the rotor shaft. Thrust washers or cover washers of this kind may be used on the one hand for axial, preferably damped, thrust of the rotor against a bearing receiving the rotor shaft, and on the other hand to protect the rotor, in particular of a commutator of a commutator motor, against emerging bearing oil which is to be returned to the bearing or to a lubricant reservoir of the bearing.

SUMMARY OF THE INVENTION

The present invention guarantees, with little production and assembly outlay and even in the presence of a possible slight skewing of the bearing which is unavoidable in the production of mass-produced items, full-surface thrust contact and complete coverage by the thrust and cover washer. This is achieved by a thrust and cover washer including an axially thrusting inelastic first annular washer part and an elastic second annular washer part. The axially thrusting inelastic first annular washer part is not in contact with the rotor shaft. The elastic second annular washer part is positively joined to the rotor shaft and rests sealingly on the rotor shaft. The thrust and cover washer may be mounted on the rotor shaft between a spherical cap bearing and a commutator of a commutator motor. Other advantageous embodiments of the present invention may be implemented according to the following description and the attached drawings.

A two-part thrust and cover washer may be configured according to an embodiment of the present invention, in which a first annular washer part is preferably made of plastic and a second annular washer part is preferably made of an elastomer. This two-part thrust and cover washer guarantees reliable mutual immobilization between the inelastic and elastic washer parts even as the washer is being delivered and mounted onto the rotor shaft. The two-part thrust and cover washer also guarantees complete sealing of the bearing against emerging bearing oil, even if the bearing is in a slightly skewed position.

BRIEF DESCRIPTION OF THE DRAWINGS

The present invention, including advantageous embodiments of the present invention in accordance with various features thereof, will be explained in more detail below with reference to schematically depicted exemplary embodiments in the drawings.

DETAILED DESCRIPTION

Figure 1:
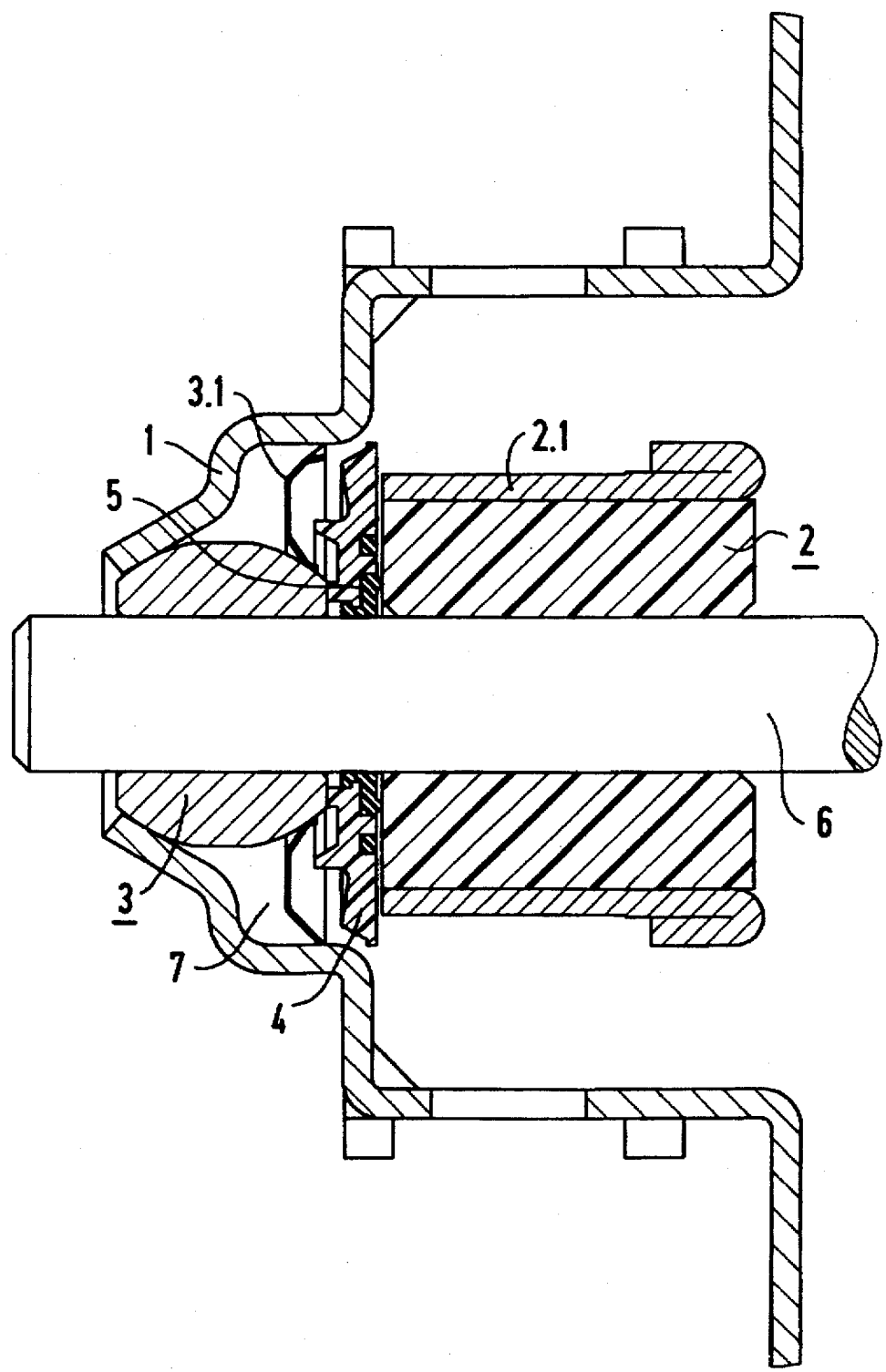
FIG. 1 illustrates, in an axial partial section, the commutator-side mounting of the rotor shaft of a commutator motor with a thrust and cover washer configured between a spherical cap bearing on one side and a commutator on the other side.
Figure 2:
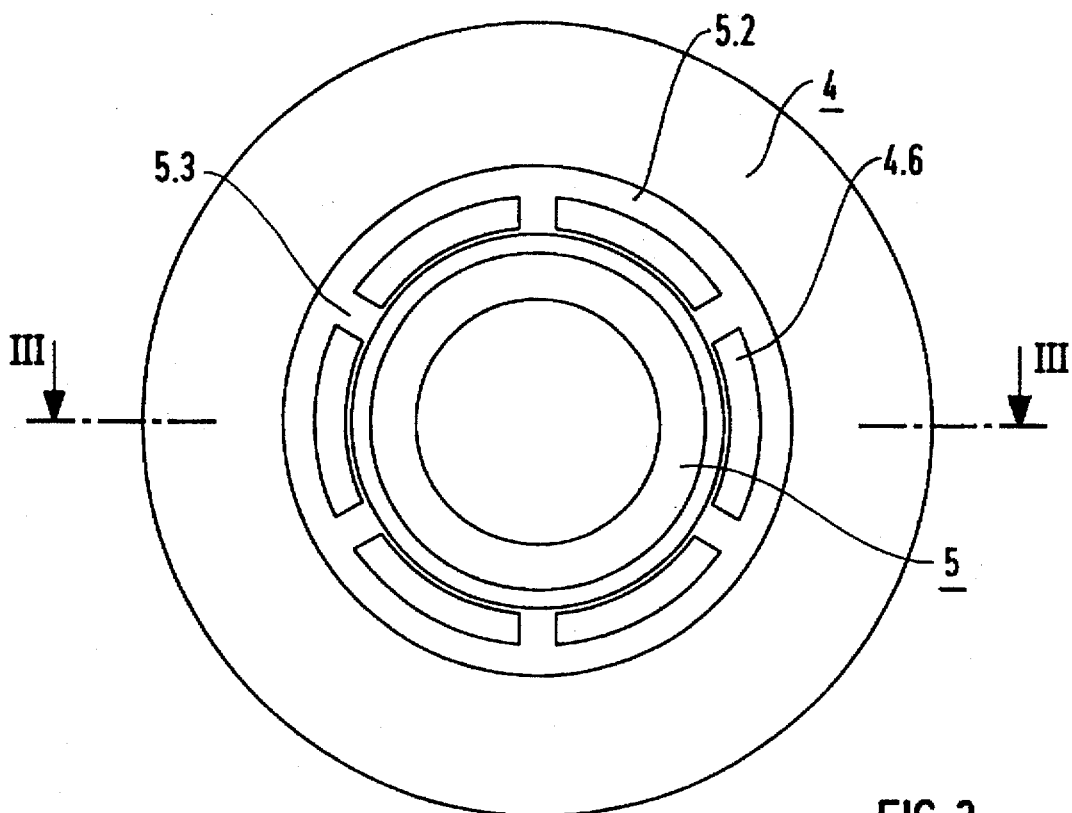
FIG. 2 illustrates an end-on top view of the thrust and cover washer according to FIG. 1.
Figure 3:
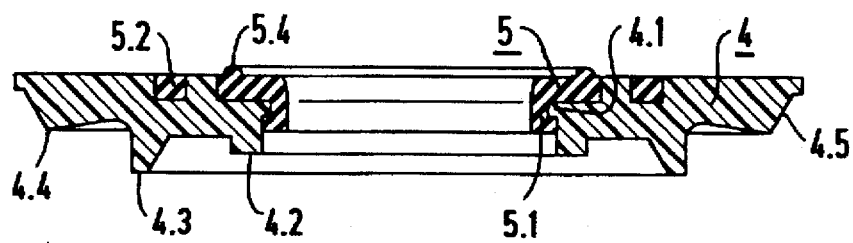
FIG. 3 illustrates the thrust and cover washer according to FIG. 2 along section line III—III.

In a cup-shaped bearing bracket 1 of a commutator motor, one commutator 2 is rotatably mounted in a spherical cap 3, with a rotor shaft 6 receiving commutator plates 2.1 arranged on the periphery. Spherical cap 3 rests with its left spherical outer surface against the end of bearing bracket 1, and is locked axially in position by a clamping stay 3.1, resting against the right spherical outer surface. The right spherical outer surface in turn is immobilized on its outer edge with respect to the cup-shaped bearing bracket 1 by jamming. A lubricant reservoir 7 is provided above spherical cap 3, by the corresponding cup-shaped configuration of bearing bracket 1. Lubricant for spherical cap 3 is stored in lubricant reservoir 7. This lubricant is preferably manufactured from sintered material.

The thrust and cover washer configured according to an embodiment of the present invention is mounted onto rotor shaft 6, between the end surface of cap 3 toward the clamping stay on the one hand and the opposing end surface of commutator 2 on the other hand. The thrust and cover washer is mounted onto rotor shaft 6 in such a way that it axially covers the reservoir and bearing space with respect to commutator 2 and, in particular, by means of an axially projecting thrust ring 4.2, ensures that the rotor is thrust against spherical cap 3 during operation.

The thrust and cover washer includes, and in a preferred embodiment, consists substantially of, an inelastic first annular washer part 4 which is preferably injection-molded from plastic, and an elastic second annular washer part 5, joined at least positively thereto and preferably made of an elastomer. This elastic second annular washer part 5 advantageously guarantees sealing with respect to rotor shaft 6, and sufficient elasticity such that the thrust and cover washer can, by slight tilting of a spherical cap with a slight assembly-related skew, adapt to thrust contact with no loss of the sealing effect against rotor shaft 6.

For axial and radial positive immobilization between the first annular washer part 4 and the second annular washer part 5, the first annular washer part 4 has, in the region of its opening toward the rotor shaft, a radially projecting retaining ring 4.1 of small axial extension which is surrounded by the elastic second annular washer part 5 in the form of an axial or radial undercut 5.1. This reliably prevents detachment of the elastic second annular washer part 5 from the inelastic first annular washer part 4 during transport and sealing placement onto rotor shaft 6 and during operation. In particular, because of the small axial extension of the radially projecting retaining ring 4.1, this also promotes a slight tilting of the thrust and cover washer to adapt to a spherical cap 3 assembled slightly askew. The radial dimensions of the rotor shaft opening of the first annular washer part 4 and of the second annular washer part 5, and the elasticity thereof, are to be defined in such a way that when the thrust and cover washer is mounted onto rotor shaft 6, sufficient mutual pressure is achieved in the interest of the desired sealing.

For tangential locking between the inelastic first annular washer part 4 and the elastic second annular washer part 5, spokes 5.3 which engage in the circumferential direction between axial projections 4.6 of the first annular washer part 4 in the interest of rotational locking and, in the interest of sufficient stability, are joined to one another by an outer ring 5.2 which is preferably injection-molded onto spokes 5.3, and are injection-molded onto the radially inner part which provides axial and radial immobilization.

The elastic second annular washer part 5 can be joined to the inelastic first annular washer part 4 as an initially separate component, in particular by being pushed on, or can be injection-molded onto it in the manner described above, thereby ensuring positive immobilization by means of undercuts.

According to one embodiment of the present invention, the elastic second annular washer part 5 is equipped at its end surface facing commutator 2 with a support and sealing ring edge 5.4, preferably integrally injection-molded on, which serves both as an axial impact damper and also as an additional seal, especially if the thrust and cover washer is in a slightly skewed position, when thrust against a correspondingly skewed spherical cap 3.

The inelastic first annular washer part 4 has on its end surface facing spherical cap 3, radially outside its axially projecting thrust edge 4.2, a first circumferential slinger edge 4.3, and at a further radial distance a second circumferential slinger edge 4.4 for additional covering protection against emerging bearing oil. The two slinger edges 4.3 and 4.4 ensure that any bearing oil which emerges is slung against the inner wall of the cup-shaped bearing bracket 1 and thus returned to lubricant reservoir 7, which is delimited on the outside by the bearing bracket 1. As an additional measure to return any bearing oil which emerges, a runoff bevel 4.5 is advantageously provided on the outer edge of the first annular washer part 4. The runoff bevel 4.5 is oriented toward spherical cap 3 such that emerging bearing oil is returned to slinger edges 4.4 and 4.3 lying radially below, and in particular, even when rotor shaft 6 is stationary or running slowly.

What is claimed is:

1. A thrust and cover washer for a bearing of a rotor shaft, wherein the thrust and cover washer is mounted on the rotor shaft, the thrust and cover washer comprising:

an axially thrusting inelastic first annular washer part which is not in contact with the rotor shaft; and an elastic second annular washer part positively joined to the rotor shaft and resting sealingly on the rotor shaft, wherein the thrust and cover washer is mounted on the rotor shaft between a spherical cap bearing and a commutator of a commutator motor.

2. A thrust and cover washer according to claim 1, further comprising a push-on axial join between the first annular washer part and the second annular washer part.

3. A thrust and cover washer according to claim 1, further comprising tangential undercuts for mutual positive tangential immobilization between the first annular washer part and the second annular washer part.

4. A thrust and cover washer according to claim 1, wherein the second annular washer part is injection-molded onto the first annular washer part.

5. A thrust and cover washer according to claim 1, further comprising at least one lubricant slinger edge on the end of the first annular washer part facing the spherical cap bearing.

6. A thrust and cover washer according to claim 1, further comprising a runoff bevel of the first annular washer part on the outer edge and oriented toward the spherical cap bearing, for lubricant return when the rotor shaft is stationary or running slowly.

7. A thrust and cover washer according to claim 1, further comprising an axially projecting thrust ring oriented toward the spherical cap bearing, on the end surface of the first annular washer part facing the spherical cap bearing.

8. A thrust and cover washer according to claim 1, further comprising an axially projecting support and sealing ring resting against the end surface of a commutator retained on the rotor shaft, on the end of the second annular washer part facing away from the spherical cap bearing.

9. A thrust and cover washer according to claim 1, wherein the first annular washer part is made of plastic and the second annular washer part is made of an elastomer.

10. A thrust and cover washer according to claim 1, further comprising axial and radial undercuts in the form of a retaining ring surrounded axially and radially inwardly by the second annular washer part and projecting radially inward, in the edge region of the rotor shaft opening of the first annular washer part, for mutual positive axial and radial immobilization between the first annular washer part and the second annular washer part.

11. A thrust and cover washer for a bearing of a rotor shaft, wherein the thrust and cover washer is mounted on the rotor shaft, the thrust and cover washer comprising:

an axially thrusting inelastic first annular washer part made of plastic, which is not in contact with the rotor shaft; and an elastic second annular washer part made of an elastomer positively joined to the rotor shaft and resting sealingly on the rotor shaft.

12. A thrust and cover washer according to claim 11, further comprising a push-on axial join between the first annular washer part and the second annular washer part.

13. A thrust and cover washer according to claim 11, wherein the second annular washer part is injection-molded onto the first annular washer part.

14. A thrust and cover washer according to claim 11, further comprising at least one lubricant slinger edge on the end of the first annular washer part facing a spherical cap bearing.

15. A thrust and cover washer according to claim 11, further comprising a runoff bevel of the first annular washer part on the outer edge and oriented toward a spherical cap bearing, for lubricant return when the rotor shaft is stationary or running slowly.

16. A thrust and cover washer according to claim 11, further comprising an axially projecting thrust ring oriented toward a spherical cap bearing, on the end surface of the first annular washer part facing a spherical cap bearing.

17. A thrust and cover washer according to claim 11, further comprising an axially projecting support and sealing ring resting against the end surface of a commutator retained on the rotor shaft, on the end of the second annular washer part facing away from a spherical cap bearing.

18. A thrust and cover washer according to claim 11, further comprising tangential undercuts for mutual positive tangential immobilization between the first annular washer part and the second annular washer part.

19. A thrust and cover washer according to claim 11, further comprising axial and radial undercuts in the form of a retaining ring surrounded axially and radially inwardly by the second annular washer part and projecting radially inward, in the edge region of the rotor shaft opening of the first annular washer part, for mutual positive axial and radial immobilization between the first annular washer part and the second annular washer part.

20. A thrust and cover washer for a bearing of a rotor shaft, wherein the thrust and cover washer is mounted on the rotor shaft, the thrust and cover washer comprising:

an axially thrusting inelastic first annular washer part which is not in contact with the rotor shaft;

an elastic second annular washer part positively joined to the rotor shaft and resting sealingly on the rotor shaft; and axial and radial undercuts in the form of a retaining ring surrounded axially and radially inwardly by the second annular washer part and projecting radially inward, in the edge region of the rotor shaft opening of the first annular washer part, for mutual positive axial and radial immobilization between the first annular washer part and the second annular washer part.

21. A thrust and cover washer according to claim 20, wherein the second annular washer part is injection-molded onto the first annular washer part.

22. A thrust and cover washer according to claim 20, further comprising at least one lubricant slinger edge on the end of the first annular washer part facing a spherical cap bearing.

23. A thrust and cover washer according to claim 20, further comprising a runoff bevel of the first annular washer part on the outer edge and oriented toward a spherical cap bearing, for lubricant return when the rotor shaft is stationary or running slowly.

24. A thrust and cover washer according to claim 20, further comprising tangential undercuts at a radially outward distance from the axial and radial undercuts, for mutual positive tangential immobilization between the first annular washer part and the second annular washer part.

25. A thrust and cover washer according to claim 20, further comprising a push-on axial join between the first annular washer part and the second annular washer part.

26. A thrust and cover washer for a bearing of a rotor shaft, wherein the thrust and cover washer is mounted on the rotor shaft, the thrust and cover washer comprising:

an axially thrusting inelastic first annular washer part which is not in contact with the rotor shaft;

an elastic second annular washer part positively joined to the rotor shaft and resting sealingly on the rotor shaft; and tangential undercuts for mutual positive tangential immobilization between the first annular washer part and the second annular washer part.

27. A thrust and cover washer according to claim 26, further comprising a push-on axial join between the first annular washer part and the second annular washer part.

28. A thrust and cover washer according to claim 26, further comprising at least one lubricant slinger edge on the end of the first annular washer part facing a spherical cap bearing.

29. A thrust and cover washer according to claim 26, wherein the second annular washer part is injection-molded onto the first annular washer part.

30. A thrust and cover washer according to claim 26, further comprising a runoff bevel of the first annular washer part on the outer edge and oriented toward a spherical cap bearing, for lubricant return when the rotor shaft is stationary or running slowly.

31. A thrust and cover washer for a bearing of a rotor shaft, wherein the thrust and cover washer is mounted on the rotor shaft, the thrust and cover washer comprising:

an axially thrusting inelastic first annular washer part which is not in contact with the rotor shaft;

an elastic second annular washer part positively joined to the rotor shaft and resting sealingly on the rotor shaft; and a push-on axial join between the first annular washer part and the second annular washer part.

32. A thrust and cover washer according to claim 31, further comprising at least one lubricant slinger edge on the end of the first annular washer part facing a spherical cap bearing.

33. A thrust and cover washer according to claim 31, further comprising a runoff bevel of the first annular washer part on the outer edge and oriented toward a spherical cap bearing, for lubricant return when the rotor shaft is stationary or running slowly.

34. A thrust and cover washer according to claim 31, wherein the second annular washer part is injection-molded onto the first annular washer part.

* * * * *